United States Patent [19]

Rudi

[11] 4,438,879

[45] Mar. 27, 1984

[54] SUSPENSION FOR THE PIVOTABLY SEATED TAPE DRIVE MOTOR IN A CASSETTE MAGNETIC TAPE DEVICE

[75] Inventor: Guttorm Rudi, Fjellhamar, Norway

[73] Assignee: Tandberg Data A/S, Oslo, Norway

[21] Appl. No.: 363,436

[22] Filed: Mar. 30, 1982

[30] Foreign Application Priority Data

Mar. 31, 1981 [DE] Fed. Rep. of Germany ....... 3112802

[51] Int. Cl.³ .................... B65H 17/20; F16H 13/10; G11B 15/28
[52] U.S. Cl. .................................. 226/188; 74/209; 360/96.3
[58] Field of Search ............. 226/188; 360/96.3, 96.4; 74/207, 208, 209; 242/201, 200

[56] References Cited

U.S. PATENT DOCUMENTS

| | | | |
|---|---|---|---|
| 2,942,488 | 6/1960 | Faulkner | 74/208 |
| 2,993,355 | 7/1961 | Forsberg | 74/207 X |
| 3,240,079 | 3/1966 | Atsumi | 74/207 |
| 3,924,823 | 12/1975 | Cohen et al. | 360/96.3 X |
| 3,932,892 | 1/1976 | Saito | 360/96 |

FOREIGN PATENT DOCUMENTS 1237352 3/1967 Fed. Rep. of Germany .
353547 5/1961 Switzerland .

*Primary Examiner*—John M. Jillions
*Assistant Examiner*—Scott J. Haugland
*Attorney, Agent, or Firm*—Hill, Van Santen, Steadman & Simpson

[57] ABSTRACT

A system is employed for pivotably seating capstan motors in cassette magnetic tape devices. Two bearing throats whose ends are hemispherically designed are disposed at two inside corner edges of a principal frame of the tape device and are clamped there by means of two sink screws positioned next to the bearing necks. The motor is positioned in a bearing fork and the bearing necks proceed through openings in the free ends of the bearing fork and press against the motor, so that a play-free suspension of the motor is achieved.

3 Claims, 2 Drawing Figures

SUSPENSION FOR THE PIVOTABLY SEATED TAPE DRIVE MOTOR IN A CASSETTE MAGNETIC TAPE DEVICE

BACKGROUND OF THE INVENTION

The invention relates to a suspension for the pivotably seated tape drive motor in a cassette magnetic tape device, particularly cassette magnetic tape devices as are employed in conjunction with data processing systems. It is particularly important for magnetic cassette tape devices of this type that they always function reliably even under extreme conditions such as, for example, under high acceleration, as can occur in vehicles of all types.

It has become known for cassette magnetic tape devices of this type to place the pivot axis of the capstan motor in such manner that it proceeds through the center of gravity of the motor. Further, it is known to provide a spring element with the assistance of which the capstan wheel disposed on the motor shaft is pressed against the drive wheel in the cassette with a defined force. When this pressure force is too low, slippage arises; when, in contrast thereto, the force is too great, this leads to increased wear of the motor shaft bearings or, respectively, of the drive wheel. Given too great a pressure force, moreover, a deformation of the friction coating of the drive wheel occurs. It is therefore extremely important that the suspension for the motor have as little friction as possible. Also, the friction should not change and play should be reduced to the greatest extent possible. To resolve this problem, it is known, for example, to seat the motor in a fork-shaped support mount with the assistance of two balls. In order, on the one hand, to achieve freedom of play but, on the other hand, to prevent a seizing of the motor, the ball bearings must be very precise. Also, one of the two balls must be adjustable. It has been proven that such systems are very difficult to adjust. Either one of the balls has too much play or, on the other hand, too much friction. Moreover, the balls are difficult to manipulate during assembly. Also, strong forces occur given transport shocks which attempt to press the balls out of their seats.

SUMMARY OF THE INVENTION

It is an object of the present invention to create a motor suspension of the type initially described which guarantees a play-free seating of the motor and, even given severe transport shocks, a reliable seating. However, the suspension must also simultaneously permit a simple and reliable adjustment. This object is achieved by means of two bearing necks disposed in two inside corner edges of the principal frame of the tape device, and by designing the ends of the bearing necks facing the motor hemispherically. Two sink screws are disposed next to the bearing necks for clamping the bearing necks at the inside corner edges of the principal frame of the device. A bearing fork for the acceptance of the motor is provided as well as by openings in the free ends of the bearing fork through which the bearing necks project and press against the motor.

By means of employing bearing necks whose ends are hemispherically designed and press against the motor, only punctiform contact exists where the bearing necks press against the motor. This provides ease of adjustment and low frictional forces. On the other hand, the forces occurring given transport shocks are reliably absorbed by the bearing necks projecting through the openings in the free ends of the bearing fork. The disposition of the bearing necks in two inside corner edges of the principal device frame, in conjunction with the sink screws disposed next to them, makes a secure clamping of the bearing necks and, on the other hand, a particularly simple adjustment of the bearing necks relative to the motor possible.

DESCRIPTION OF THE PREFERRED EMBODIMENTS

Figure 1:
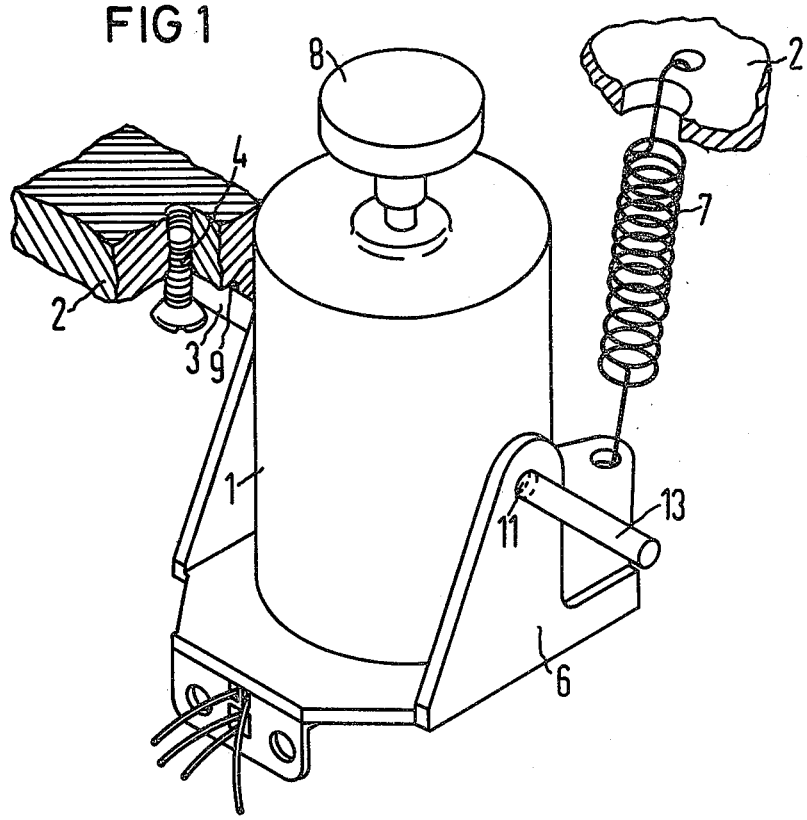
FIG. 1 shows in perspective view the disposition of the motor in the bearing fork as well as the disposition of bearing necks and sink screws in accordance with the invention.

The illustrated arrangement consists of motor 1 which is secured in a bearing fork 6, the latter exhibiting bearing retaining openings 11 and 12 at its free ends and a base portion against which the motor is seated. Two bearing necks 3, 13 are hemispherically designed at their ends facing the motor. These throats project through the openings 11, 12 of the bearing fork and press against the body of the motor 1. The other ends of the bearing necks 3, 13 are disposed in two inside edges 9, 10 which together form an angled corner edge of the principal device frame 2 and are clamped there by means of the cone-shaped heads of sink screws 4, 5, particularly by their under-surface. The pivot axis of the motor 1 at the bearing necks 3, 13 also is established as the center of gravity of the motor 1. A spring 7 disposed between the principal frame of the device 2 and the pivotable bearing fork 6 creates a defined bias with which the capstan wheel 8 disposed on the motor shaft is pressed against the drive wheel (not illustrated here) in the magnetic tape cassette.

Figure 2:
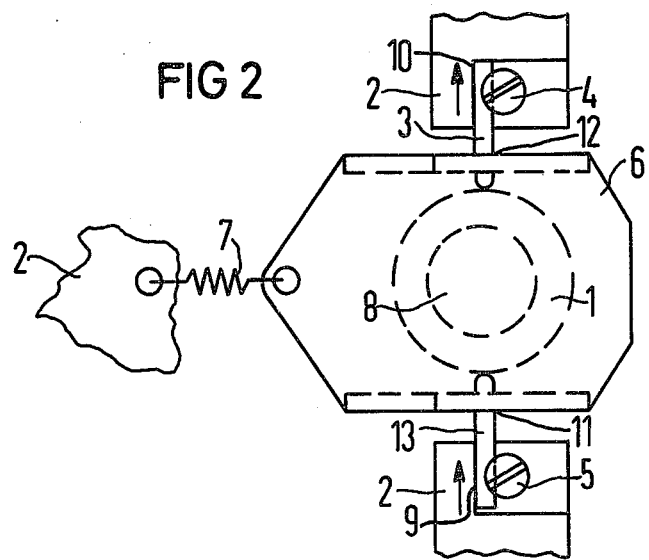
FIG. 2 shows a bottom view of the arrangements of FIG. 1, on the basis of which the disposition and effect of the bearing necks and of the sink screws is explained.

The play-free adjustment of the motor 1 between the bearing necks 3 or, respectively, 13, occurs as follows: first, after only a preliminary assembly of the total unit, the bearing neck 3 is secured at an inside edge or corner 10 of the principal device frame 2 with the assistance of the sink screw 4. Due to the friction existing between the bearing neck 3 and the conical underside of the head of the sink screw 4, the bearing neck 3 is moved in the direction of the arrow illustrated in FIG. 2 until the bearing neck 3 presses against a stop in the principal frame of the device 2. By continuing to turn the screw 4, finally the bearing neck 3 is securely attached in the inside edge 10 of the principal frame of the device 2. Subsequently, the bearing neck 13 is fixed in the inside edge 9 of the device frame 2 in an analogous manner with the assistance of the sink screw 5. The friction thereby existing between the bearing neck 13 and the head of the sink screw 5 causes the bearing neck 13 to move in the direction toward the motor 1 until its hemispherical end strikes against the motor. By continuing to turn the sink screw 5, the bearing neck 13 is then securely fixed at the inside corner edge 9 of the principal frame of the device 2. It can be seen that an absolutely play-free seating of the motor 1 can be achieved in this manner. Experience has further demonstrated that, by means of this type of adjustment and seating of the motor between the two bearing necks 3 or, respectively 13, a high friction between the ends of the bearing necks 3, 13 and the motor likewise does not occur.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A suspension for pivotably seating a capstan motor in a cassette magnetic tape device, comprising: a bearing fork having two free ends and a bearing retaining aperture in each free end, the bearing fork being shaped so as to receive the capstan motor in a seating position against a base portion thereof between the free ends; a spring element connected between the bearing fork and a portion of a principal frame of the tape device so that a capstan wheel of the motor is pressed against a drive wheel of the cassette with a defined force; a bearing neck freely positioned in and through each of the bearing retaining apertures, each of the bearing necks having a bearing end facing and in contact with the motor; opposite ends of each of the bearing necks being received against respective inside corner edges of portions of the principal frame of the tape device; respective sink screws having heads at each of said opposite ends of the bearing necks and positioned at the respective corner edges such that an under surface of the head of each of the sink screws clamps the respective bearing neck at the inside corner edge; and the sink screws being arranged such that by turning one of the other sink screws the respective bearing neck abuts against an end stop at the corner edge while the other bearing neck is moved along the corner edge by the action of the sink screw when turning so as to tightly clamp the capstan motor between the two bearing ends of the bearing necks.

2. A suspension according to claim 1 wherein the screw heads have a conical under surface.

3. A magnetic tape device capstan motor suspension for pivotably seating the capstan motor, comprising: a bearing fork having upwardly extending free ends with respective bearing retaining apertures therein; a capstan motor disposed between the free ends of the bearing fork; respective cylindrically shaped bearing necks each having a hemispherical end rotatably positioned through the bearing retaining openings into tight pivotably abutting contact with the capstan motor; a spring connected between a portion of a principal frame of the tape device and the bearing fork so as to bias a capstan wheel of the motor against a drive wheel with a defined force; opposite ends of the bearing necks being received against respective angled edges formed in portions of the principal device frame; screws having heads positioned at the respective angled edges such that the head of the screws when tightened down against the bearing necks clamps them in position in the respective angled edges; and the screw heads being positioned and shaped such that when one of the screw heads is turned the end of the respective bearing neck abuts against an end stop at the respective angled edge, and when the other screw is turned the clamping action between the hemispherical ends is increased as the respective bearing neck moves toward and into contact with the motor.

* * * * *